Feb. 28, 1950 W. E. MILLER 2,498,740
APPARATUS FOR HANDLING STACKED CONTAINERS
Filed May 2, 1946 5 Sheets-Sheet 2

Fig. 2

INVENTOR.
Walter Earl Miller
BY
his Attorney

Feb. 28, 1950 W. E. MILLER 2,498,740
APPARATUS FOR HANDLING STACKED CONTAINERS
Filed May 2, 1946 5 Sheets-Sheet 3

INVENTOR.
Walter Earl Miller
BY
his Attorney

Feb. 28, 1950           W. E. MILLER           2,498,740
APPARATUS FOR HANDLING STACKED CONTAINERS
Filed May 2, 1946           5 Sheets-Sheet 4

INVENTOR.
Walter Earl Miller
BY
his Attorney

Feb. 28, 1950     W. E. MILLER     2,498,740
APPARATUS FOR HANDLING STACKED CONTAINERS
Filed May 2, 1946     5 Sheets-Sheet 5

INVENTOR.
Walter Earl Miller
BY
His Attorney

Patented Feb. 28, 1950

2,498,740

UNITED STATES PATENT OFFICE 2,498,740

APPARATUS FOR HANDLING STACKED CONTAINERS

Walter E. Miller, Placentia, Calif., assignor, by mesne assignments, to Brogdex Company, Pomona, Calif., a corporation Application May 2, 1946, Serial No. 666,667

11 Claims. (Cl. 214—1.1)

This invention relates to apparatus for handling stacked containers; and it relates more particularly to apparatus of novel construction that is operable to receive stacks of filled containers, to disassemble or break down the stacks, and at some designated delivery point to dump the contents of the individual boxes composing each stack; these operations being caused to occur automatically through suitably controlled actuation of power means arranged to produce movement of the several essential components of the apparatus system in properly coordinated sequential relation.

The apparatus of the invention has important practical utility in connection with operations which are carried on in fresh fruit and vegetable packing houses incidental to preparation of such commodities for shipment to market; and while the invention may be embodied in various forms of apparatus capable of being usefully employed for other purposes than that just mentioned, the specific apparatus shown in the accompanying drawings and hereinafter described in detail by way of example is especially well adapted for use in citrus fruit packing houses.

Different forms of apparatus for separating the component boxes of a box stack and dumping their contents have long been in use by citrus fruit packers, being commonly called stack dumps or dumpers. These have usually involved relatively complicated and expensive constructions, the operation of which has sometimes been more or less erratic and difficult to control dependably and has often been attended with undesirably rough handling of the box stacks. A general object of the present invention is to provide novel apparatus of the character described that is of simpler and less expensive construction than most stack dumpers heretofore known, as well as more easily operated and controlled, besides being fully automatic in such operation and adapted to minimize rough handling of the box stacks and the fruit or other commodity contained in the boxes.

One desirable practical form of apparatus embodying the invention and adapted to accomplish the general object aforesaid is illustrated by the accompanying drawings, wherein.

In the specific embodiment of the invention here shown, the apparatus is intended to handle stacks each consisting of six field boxes of usual type filled with oranges, for example; but it is to be understood that this is illustrative only, and that apparatus embodying the invention may be designed to handle stacks consisting of more or less than six boxes each.

Referring to the drawings, 10 represents generally an oscillatable box-stack receiving and elevating unit, which may also be called the dumper unit, pivotally mounted on a supporting frame indicated generally at 11 and resting on floor 12, for swinging movement between an upright or nearly vertical stack-receiving position A (broken lines) and inclined stack-dumping or stack-discharging position B (full lines) about a horizontal axis provided by axle 13 upon which said unit is mounted. Said axle extends transversely under said unit through a pair of retaining sleeves 14 which are secured to longitudinal frame members 15 of the unit; while its end portions are rotatably supported in bearings 16 secured to a pair of opposed uprights 17 of the frame 11. Spaced arms 18 extending forwardly at right angles from the lower end of the oscillatable unit are adapted to maintain a stack of boxes in position on the unit after delivery thereto and while said unit is being rotatably tilted from limiting position A to limiting position B. Outwardly flaring side walls 15a assist in thus holding the stack in place and they also aid in properly centering it as it is being fed into and against the unit.

Although in position A as here illustrated the longitudinal axis of unit 10 is shown extending vertically, it is sometimes desirable in practice that, in this limiting position, said axis shall be somewhat inclined from the vertical toward position B, e. g. as much as 10 degrees.

A pair of endless conveyor or elevator chains 19 are trained about upper and lower pairs 20 and 21 of opposed sprockets rigidly secured on shafts 22 and 23, respectively, which are carried in suitable bearings on the frame of the receiving and elevating unit adjacent its opposite ends.

Secured to each of said chains is a series of plates or treads 24 which, together, constitute the stack supporting members of the elevator conveyor, and which are adapted to engage and support laterally, near their opposite ends, the boxes composing stack 25 as it rests on its side, while the unit 10 is being turned downwardly into reclining position and during the subsequent stack elevating and discharging movement of the conveyor. A speed-reducing double sprocket member 26, loose on the end of axle 13, transmits power from electric motor 27 through chains 28, 29, to driving sprocket 29a on shaft 22, thereby causing the elevator conveyor to move in the direction indicated by arrow 30 whenever said motor is energized in the manner hereinafter pointed out.

Suitable provision is made for swinging the oscillatable unit 10 back and forth between positions A and B. The particular means here shown for accomplishing this has special advantages and, although the invention in its broader aspects is not limited thereto, is regarded as most desirable. Anchored at its ends to cross members 31 and 32 of the frame of unit 10 and centrally thereof is a channel member 33, semicircular in form and having its channel arms or flanges extending radially outward. Within the external peripheral guiding recess thus provided, lies a sprocket chain 34, which is secured to the elevator unit frame at points adjacent the ends of the channel member and is trained over a small sprocket 35, fast with transverse horizontal shaft 36 which is suitably journaled in bearings on frame 11. Shaft 36 also carries fast therewith a sprocket 37, driven by motor 38 through sprocket and chain connections 39, 40. The semicircular channel 33, which is of relatively large diameter as shown, may desirably be stiffened and strengthened by suitable internal bracing such as that provided by chordal members 41 whose ends are welded or otherwise rigidly secured thereto.

Motor 38 is desirably equipped with an electrically controlled brake (not shown) of any well known or suitable type that is adapted to ensure quick stopping of the unit 10 upon its arrival at either of its terminal positions, A and B, as well as to cushion the shock of stopping the unit in such terminal position, and to positively hold it therein against accidental turning movement.

Suitable means are provided for advancing stacks of filled boxes toward unit 10, and feeding stacks to it individually in properly timed sequence. In the arrangement here illustrated, box stacks are advanced in single file toward and nearly to said unit by a floor chain conveyor 42 of suitable well known type, which is intermittently driven by motor 43, the operation of the motor being controlled as hereinafter described. A relatively short floor chain conveyor 44 of similar type, continuously driven by motor 45 to move in the same direction as conveyor 42 but at a higher speed, receives an individual stack from conveyor 42, when unit 10 is in stack-receiving position, and delivers the stack to said unit.

Pivoted control lever 46 of limit switch 47 which is in the power circuit of motor 43, is disposed in the path of box-stacks advancing on conveyor 42. Said lever is spring-actuated to maintain it in its elevated (dotted line) position shown in Fig. 3 when not forced down by an advancing stack. Upon being depressed, it opens switch 47. Similarly, spring-actuated elongated control member 48, which is mounted for parallel up-an-down movement by means of pivoted supporting link 48a and by pivotal connection to switch lever 49 of switch 50, also in the power circuit of motor 43, is held in its elevated (full-line position shown in Fig. 3 to maintain switch 50 closed, except when depressed by a stack delivered to conveyor 44 by conveyor 42. By reference to Figs. 4–7 it will be seen that switches 47 and 50 are connected in parallel in the power circuit of motor 43; hence both must be opened in order to stop motor 43 and arrest movement of conveyor 42. However, switch arm or lever 46 and control member 48 are spaced apart sufficiently far to render impossible simultaneous depression of both of them by the same stack. As a stack leaves conveyor 42, it releases switch arm 46, thus opening switch 47; but as switch 50 is still closed, the advancing movement of conveyor 42 is unaffected. Advancing on conveyor 44, the stack contacts and depresses control member 48, thereby opening switch 50; still without stopping conveyor 42, which continues to operate until a succeeding stack shall have arrived at position X and again depressed switch arm 46. In the meantime the first stack will have contacted high point 51 of control member 48 to depress said member enough farther to permit the free end 52 thereof to be engaged and held down by the nose of pivoted latch 53 which is urged toward stop 54 by tensioned spring 55. At the same time, such farther depression of member 48 causes it to contact and depress spring actuated control arm 56, thereby actuating switch 57 to close the power circuit of motor 38 and cause the latter to start turning the dumper unit clockwise toward position B. With member 48 thus latched down and holding switch 50 open, motor 43 will be stopped upon arrival of a succeeding stack at position X and consequent opening of switch 47 also; thus stopping conveyor 42 and preventing delivery of such succeeding stack to conveyor 44 until after member 48 has eventually been released from said latch.

Figures 3, 3A:
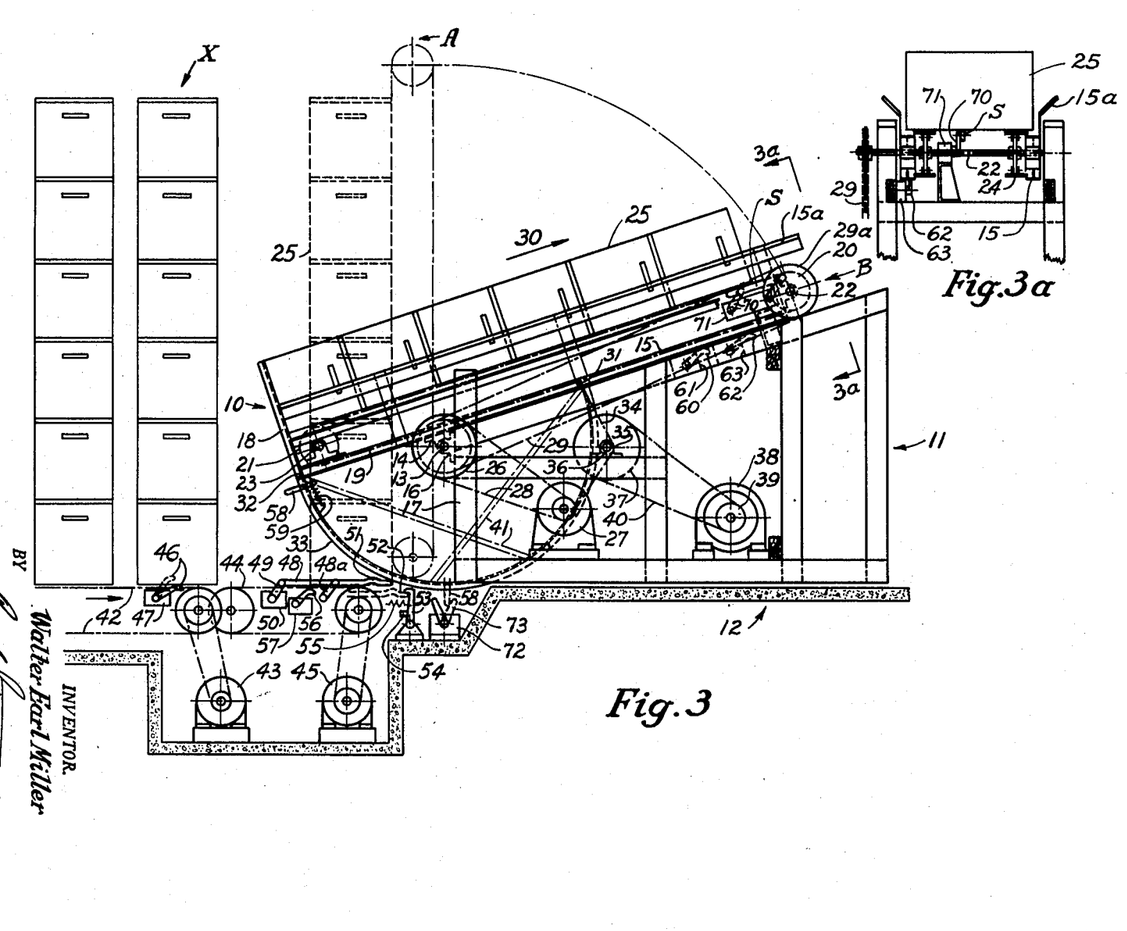
Fig. 3 is a side elevation, more or less diagrammatic in character, showing also certain additional accessory operating parts.
Fig. 3a is a partial end view, looking from the right in Fig. 3.
Figure 6:
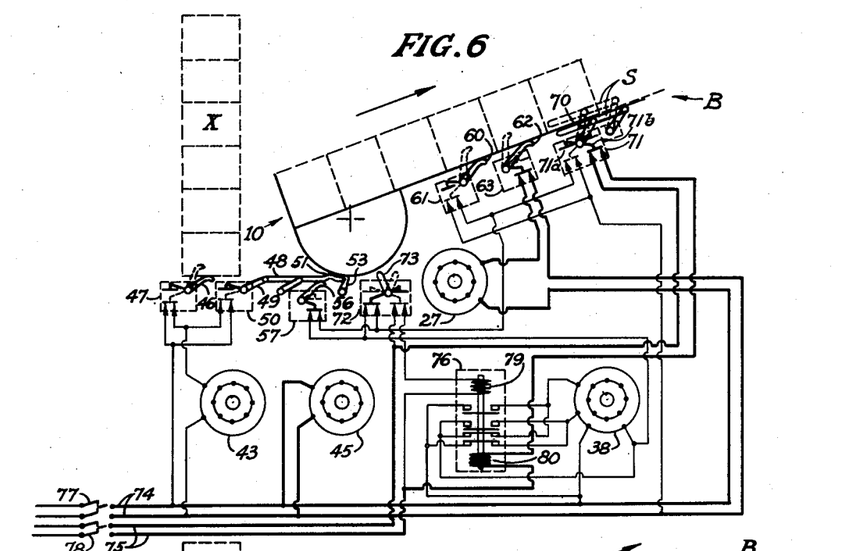

Suitable provision is made for effecting such release of member 48 at a later stage of the operating cycle. In the embodiment of the invention here specifically illustrated, this takes the form of a unidirectionally yieldable pawl-like tripping member 58 pivotally mounted on semicircular chain guide 33. Tensioned spring 59 constantly urges said detent toward an abutment (not shown) so as normally to maintain it in contact therewith and projecting radially beyond said channel guide. The arrangement is such that, when the unit 10 as viewed in Fig. 3 is turning clockwise, said detent yields and rides over any sufficiently resistant stationary object it may strike, but does not thus yield when said unit is turning counterclockwise. Accordingly, as the unit 10 starts turning clockwise from its relatively upright position A into its reclining position B, detent 58 strikes and rides over the head of latch 53 without disturbing it. When said unit has nearly reached position B, it contacts and depresses spring-actuated control arm 60 to open switch 61, which is mounted on stationary frame 11 and is in series with switch 57 in the power circuit of motor 38 (Fig. 6). At the same time, only the box stack itself strikes and depresses elongated contact shoe S, which is spring-actuated to maintain it normally in an elevated position such that, when unit 10 has nearly reached position B, the portion of the under side of the box stack exposed between the two series of conveyor treads 24 will contact said shoe. The contact shoe is pivotally connected to control arm 70 of double switch 71, also mounted on the stationary supporting frame 11. Member 71a of this double switch controls a branch circuit, which is in parallel with that controlled by switch 61 and in series with switch 57, in the power circuit of motor 38. The aforesaid depression of shoe S by contact with the box stack causes switch member 71a to open its branch circuit also; and since both parallel branch circuits are thus open upon arrival of unit 10 in position B, motor 38 is stopped. In thus arriving at position B, said unit also depresses control arm 62 of switch 63, which is likewise mounted on stationary frame 11, thereby energizing motor 27 to drive the stack-discharging elevator conveyor mechanism 19—23 and thus move the stack of boxes toward the upper end of the unit which, in position B, may be inclined about 70° from the vertical in a typical instance.

Figure 1:
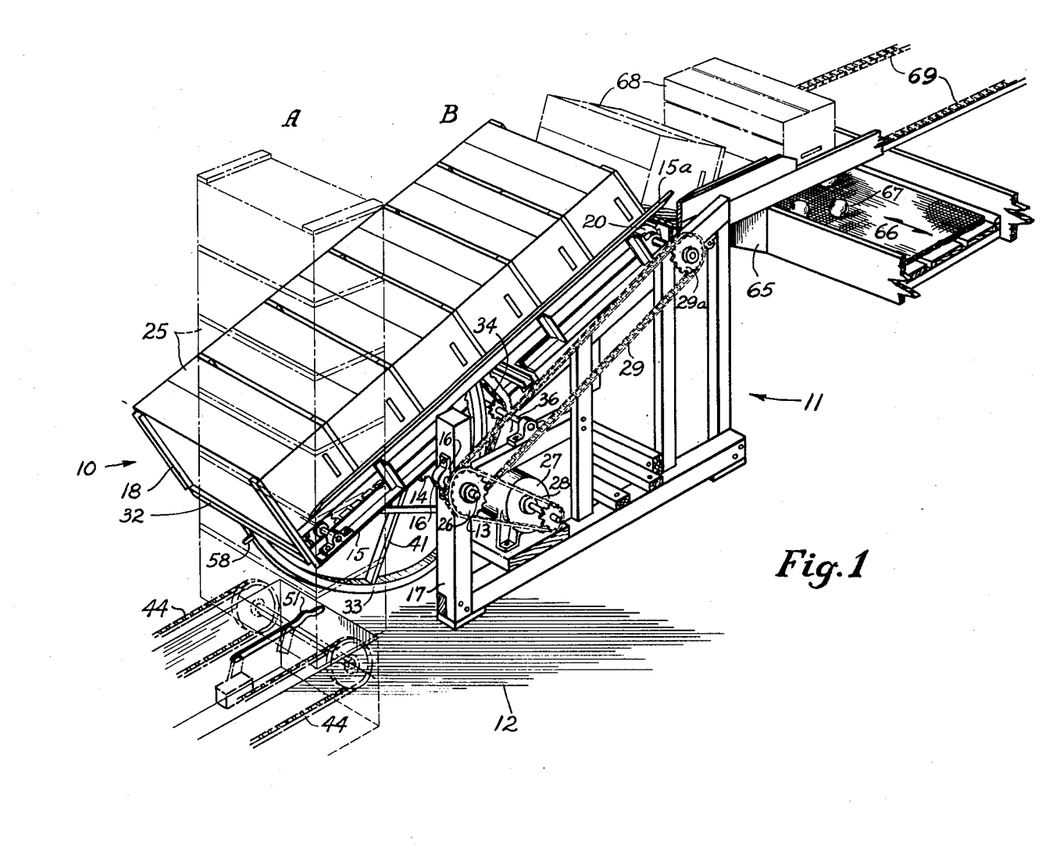
Fig. 1 is a perspective, in elevation.
Figure 2:
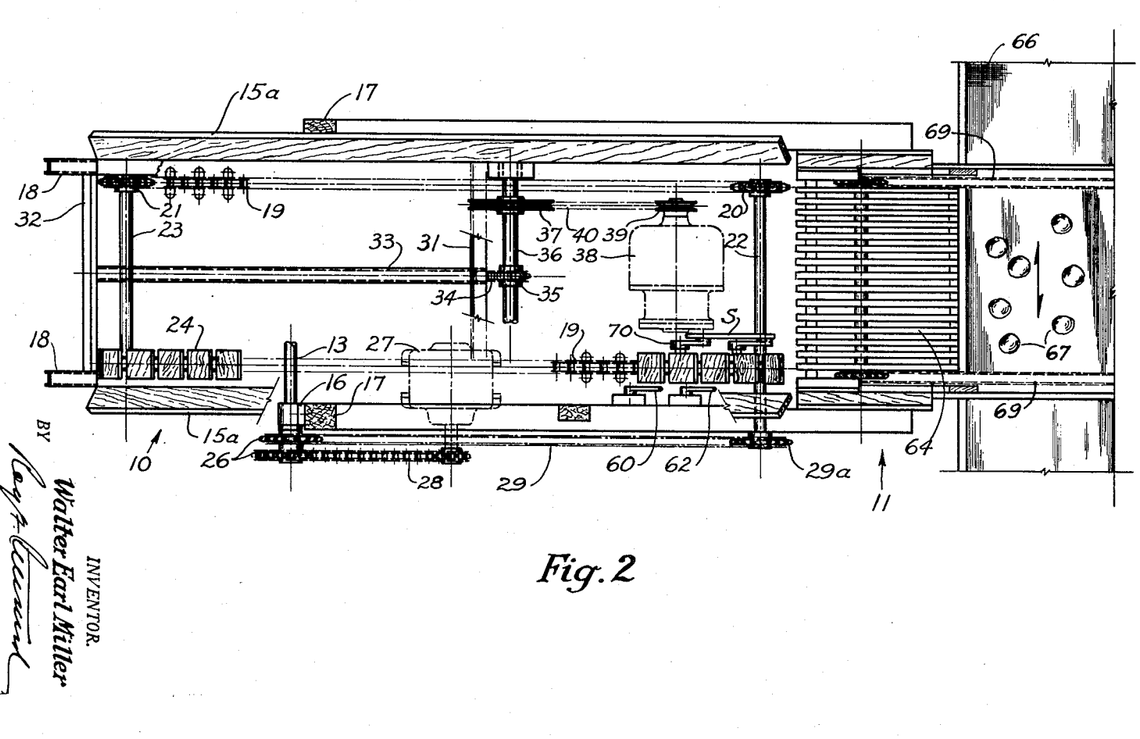
Fig. 2 is a plan view, with certain parts removed or broken away and in section.

As the stack of boxes is moved upwardly along the inclined unit 10 as a result of switch arm 62 being depressed, the boxes successively arriving at its upper end are discharged therefrom, topple over forwardly upon the slatted bottom 64 of a downwardly inclined chute indicated generally at 65, at the same time automatically overturning and dumping their contents, such as oranges, which then roll down the chute and upon cross-conveyor belt 66, as indicated at 67, to be carried away thereby in either transverse direction to any desired point for further handling. In Fig. 1, this toppling forward and overturning movement of successive individual boxes as they arrive at the delivery end of unit 10 is illustrated in broken lines at 68. As the boxes drop forward and overturn, they fall upon the upper runs of suitably spaced and driven endless chains 69 of a conventional conveyor mechanism, which conveys the inverted empty boxes horizontally above said cross-conveyor belt and away from unit 10 to any convenient place of disposal.

Throughout the operation of elevating and discharging of the stack of boxes from the swingable unit 10, contact shoe S remains depressed by the boxes passing over it. Only when the last or bottom box of the original stack is delivered from the upper end of the unit, thus passing beyond and out of contact with the elongated shoe, is the latter released and returned to its elevated position. This results in actuating switch member 71a to close the power circuit of motor 38 in such manner as to cause the motor to turn unit 10 back to position A. As this return movement commences, switch arms 60 and 62 are also released and resume their elevated positions. The resultant upward movement of arm 62 actuates switch 63 to open the power circuit of motor 27 and stop the stack-discharging conveyor; while that of arm 60 causes switch 61 to close its branch of the power circuit of motor 38.

An instant before unit 10 regains position A, detent 58 strikes the nose of latch 53, moving it backward sufficiently to release contact shoe 48, which thereupon automatically resumes its upper position. In so doing, it causes switch 57 to open the power circuit of motor 38, thereby stopping said motor; it also causes switch 50 to close the power circuit of motor 43, thereby setting conveyor 42 in motion to deliver another stack to continously driven conveyor 44.

The electrical system generally described hereinabove for automatically actuating and controlling the operation of the disclosed apparatus is illustrated in greater detail in the circuit diagrams comprised in Figs. 4–7, in each of which the path of current flow, for the corresponding particular operating phase represented, is indicated by heavy lines. Power for operating the various motors is taken from current supply mains 74 at usual commercial voltage. Current is supplied from mains 75, at lower voltage in this instance for operating an electromagnetic reversing switch 76 which controls the direction in which motor 38 rotates.

Figure 4:
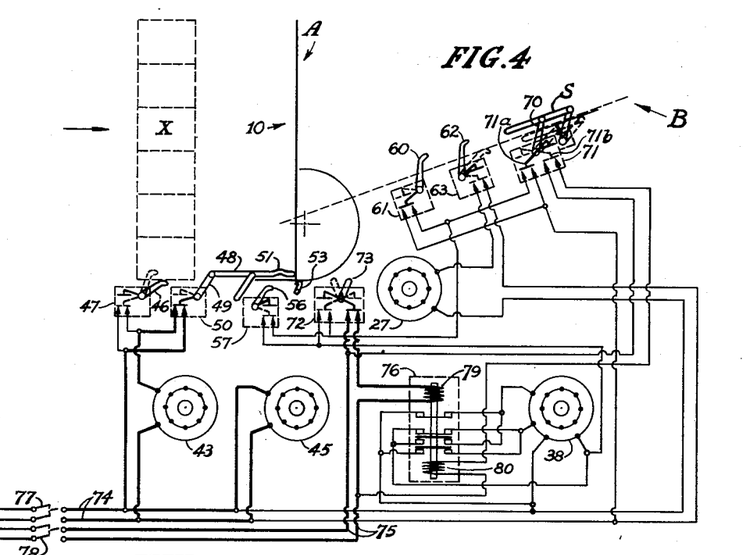
Figs. 4 to 7, inclusive, show diagrammatically the condition of the electrical circuits controlling actuation of the several motors included in the illustrated apparatus system, at successive stages of the operating cycle.

Assuming the dumper unit 10 to be in stack-receiving position A as illustrated in Fig. 4, the dumper is empty and ready to receive the stack of boxes shown as being in position X. The main supply switches 77 and 78 being closed, not only is motor 45 actuated to drive the short conveyor 44 continuously, but the intermittently driven stack-advancing conveyor 42 is also set in operation because, in this operating phase, switch control member 48 is in its elevated position and switch 50 therefore closes the power supply circuit of motor 43. The fact that arm 46 controlling switch 47, which is connected in parallel with switch 50, is depressed by the stack in position X to open the alternate power supply circuit of motor 43 is immaterial; for switch arm 46 and controlling member 48 (to which switch arm 49 is pivotally connected) are so spaced apart that it is impossible for a single stack to depress both at the same time. Therefore the stack shown at X in Fig. 4 is advanced by conveyor 42 and delivered to the more rapidly moving conveyor 44 which feeds it into unit 10. In leaving conveyor 42, the stack releases switch arm 46, thus closing the contacts of switch 47. Moving forward more rapidly on conveyor 44, the stack contacts switch-control member 48 and at first depresses it only enough to open the contacts of switch 50 through movement of the switch control arm 49. This does not stop motor 43, however, the power circuit of which remains closed through switch 47 until a succeeding stack has been moved into position X to depress switch arm 46 and thus open the contacts of switch 47 also. In the final feeding movement of the first stack on conveyor 44, the stack contacts the elevated point 51 of control member 48, further depressing the latter sufficiently to contact and depress arm 56 of switch 57, thus closing the power circuit of motor 38, which also includes switches 61 and 71 that are already closed, and starting said motor. At this instant, the free end of control member 48 is caught and held in its lowermost position by latch 53. Since, in the phase illustrated in Fig. 4, detent 58 has already forced spring-controlled arm 73 of switch 72 toward the right, thereby closing the low voltage circuit through coil 79 of reversing switch 76 and pre-setting the contacts thereof for flow of current from mains 74 through motor 38 in the direction indicated in Fig. 5, said motor now rotates in the proper direction to start turning the dumper unit 10 clockwise. As this clockwise movement commences (Fig. 5), detent 58 moves away from switch arm 73, permitting the latter to return to its normal position and thus open the low-voltage circuit through coil 79 to de-energize it. This is without effect upon the position of contacts of reversing switch 76, which have no neutral position but always remain in whichever of two possible circuit-closing positions they may have been set by energization of coil 79 or coil 80, as the case may be.

Figure 5:
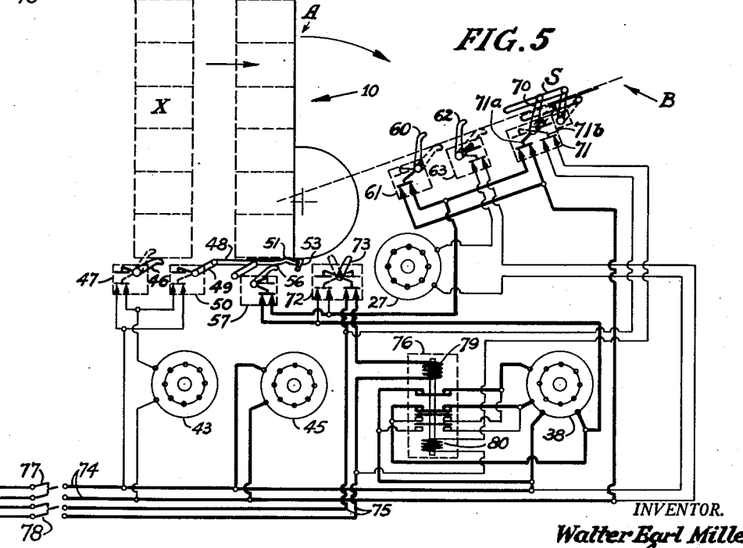

In the meantime, if a succeeding stack has arrived at position X as shown in Fig. 5, it has depressed lever arm 46 and thereby opened switch 47. Because switch 50 is also open, this stops motor 43 and prevents delivery of such succeeding stack to the feed conveyor 44 until, at a later point in the operating cycle, control member 48 shall be released from latch 53.

Slightly before the dumper arrives at position B (Fig. 6), switch arms or levers 60 and 62 are depressed by contact of the swinging dumper frame therewith. Switch lever 70 being so positioned that it cannot be contacted by the descending dumper unit, is depressed by contact of the box stack only therewith. Such depression of switch levers 60 and 70 opens switches 61 and member 71a of switch 71 in the power circuit of motor 38, which therefore stops; while the depression of lever 62 closes switch 63 to actuate motor 27, which thereupon drives chains 19 of the stack conveyor to move the recumbent stack of boxes upwardly on the dumper in the direction indicated by the arrow. The depression of switch lever 70 also causes member 71b of the double acting switch 71 to close the low-voltage circuit through coil 80 of the reversing switch 76 and thereby re-set the switch contacts so that, when the power circuit of motor 38 is again closed at a later point in the operating cycle, current will flow through said motor in the opposite direction from that previously described, reversing its direction of rotation and causing the dumper unit to turn counter-clockwise.

Figure 7:
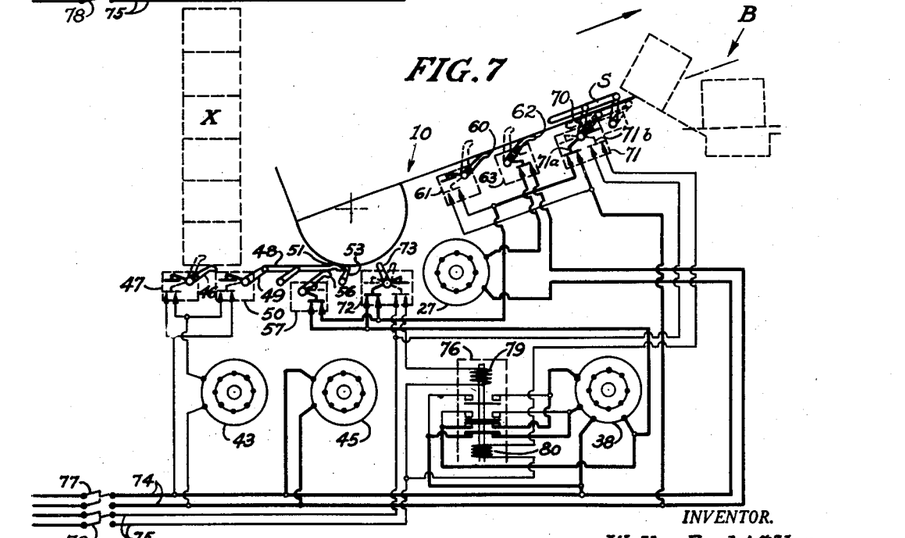

The last or bottom box of the stack having been discharged from the upper end of the dumper unit, thereby releasing contact show S and permitting it to rise, double-acting switch 71 is thereby actuated to close the power circuit through motor 38, and at the same time to open the energizing circuit of coil 80 of the reversing switch (Fig. 7). The ensuing counter-clockwise turning movement of the dumper unit away from stationary supporting frame 11 then releases switch levers 62 and 60, permitting them to rise and actuate their respective switches to stop the stack conveyor and close the parallel branch of the power circuit through motor 38.

As the dumper unit approaches position A (Fig. 7), detent 58 trips latch 53, permitting contact 48 to resume its elevated position (Fig. 4). This releases switch arm 56 which thereupon moves upward to open switch 57 and stop motor 38; while switch 50 is also actuated through its arm 49 to start motor 43 and cause operation of conveyor 42 to be resumed. In the meantime, the further small final movement of the dumper unit in regaining position A and completing the operating cycle, causes detent 58 to move switch lever 73 to the right, closing the energizing circuit of coil 79 to re-set reversing switch 76 in anticipation of another operating cycle being initiated through reception of the on-coming next stack by the dumper unit.

From the foregoing it is evident that the invention provides a stack dumper which, in the embodiment illustrated, is completely automatic in its operation, and which handles the stacks smoothly and with minimum jar or shock, thereby avoiding damage to easily injured articles, such as fruit, which the boxes may contain, besides saving wear and tear on the apparatus. At all times the movements of the swinging cradle-like dumper unit are positively controlled by its actuating motor and driving connections, regardless of how the weight of the stack is distributed on said unit. In the present example, operating power is economized by the unsymmetrical pivoting of the unit on an axis located closer to its lower end than to its discharge or delivery end. In this way advantage is taken of the downward turning moment exerted by the unbalanced weight of the stack in promoting movement of said unit from position A to position B, but at a speed which is at all times held to a safe maximum through the positive control afforded by the described operating means, both mechanical and electrical. The specific form of driving connections between motor 38 and unit 10, employed in the specific embodiment of the invention here illustrated, contributes importantly to practical realization of this advantage and, although the invention is not restricted thereto, is therefore especially to be recommended. Use of the sprocket and chain drive 39, 40, with the chain guided over the semi-circular channel 33 centered in the horizontal axis about which the unit swings, ensures ample and constant driving leverage while at the same time avoiding the considerably greater expense, both in first cost and subsequent upkeep, that would be entailed in using a pinion and gear drive, for example, of comparable driving ratio. Use of some other specific form of rotatable driving member and flexible power transmitting element, in place of the sprocket and chain shown, is of course feasible.

What is claimed is:

1. Apparatus for handling stacked boxes or the like, which comprises a stack receiving and discharging unit mounted for swinging movement about a horizontal axis between a relatively upright stack-receiving position and a reclining position for stack discharge, an electric motor and driving connections operable to turn said unit from either position into the other; discharge conveyor means adapted to move a stack longitudinally of said unit to discharge individual boxes therefrom successively, an electric motor and means for driving said conveyor means therefrom; other conveyor means operable to advance a plurality of stacks of boxes toward said unit and to feed the stacks thereto one at a time, and an electric motor for driving such other conveyor means; in combination with operating power circuits for the several motors; said combination including: a control member responsive to arrival of said stack substantially at said stack-receiving and discharging unit to interrupt the power circuit of the stack-advancing conveyor motor and complete the power circuit of the unit-driving motor, whereby said unit is actuated to swing toward its reclining position; means responsive to the arrival of said unit and the stack supported thereon substantially at said reclining position to interrupt the power circuit of said unit-driving motor and close the circuit of the discharge conveyor motor, part of said last-named means being released upon passage of the last box of the stack from said unit to again complete the power circuit of said unit-driving motor for starting swinging movement of said unit back to stack-receiving position, another part of said last-named means being released by such return movement of said unit to interrupt the power circuit of said discharge conveyor; said stack-advancing control member being adapted and arranged for actuation again by said unit near the end of the return movement thereof to interrupt the power circuit of said unit-driving motor and complete the circuit of said stack-advancing conveyor motor.

2. Apparatus for handling stacked boxes or the like, which comprises a stack receiving and discharging unit mounted for swinging movement about a horizontal axis between a relatively upright stack-receiving position as one limit and a reclining stack-discharging position as the other limit, a stack-discharging conveyor mounted upon said unit for moving a stack thereon longitudinally toward the discharge end, a second conveyor movable to advance stacks of boxes toward said unit, a relatively short conveyor arranged to receive successive stacks from said second conveyor and feed them one at a time to said unit, separate electric motors respectively adapted and arranged, when suitably energized, to drive said unit and the several said conveyors, power supply circuit connections for energizing said motors, the motor for said relatively short conveyor being continuously energized, when the apparatus is operating, to drive the same continuously and at a higher linear speed than said second conveyor is driven, and circuit control means for the other motors comprising: means responsive to arrival of said unit substantially at either limit of its swing for opening the power circuit of the driving motor of said unit to arrest its movement, means responsive to arrival of said unit substantially at its upright stack-receiving position for actuating said second conveyor to deliver a stack to said relatively short conveyor, means responsive to feeding movement of such stack on said short conveyor for stopping said second conveyor and starting swinging movement of said unit into its stack-discharging position, means responsive to arrival of said unit substantially at its latter position for actuating the stack-discharging conveyor, and responsive to departure from said position for stopping said conveyor, the means for opening said power circuit upon arrival of said unit at its reclining position including means responsive to passage of the last box of a stack from said unit for closing the power circuit of its driving motor to start swinging movement of said unit back towards its stack-receiving position.

3. Apparatus as set forth in claim 2, in which the motor driving said stack receiving and discharging unit is reversible, and which includes a reversing switch for said motor, together with means responsive to arrival of said unit substantially at either limit of its swing for presetting said reversing switch to reverse the direction of rotation of said motor upon the next closing of its power circuit.

4. In a stack dumper, a stack receiving and discharging unit mounted for turning movement about a horizontal axis, an electric motor and driving connections between it and said unit, together with a suitable power circuit for said motor, operable to impart to said unit the stated turning movement, alternately in opposite directions, between stack-receiving and stack-discharging positions, means for feeding a box stack to said unit while in receiving position, means for discharging such stack from it while in discharging position, switch means in said power circuit actuatable by a stack being fed to said unit to cause said motor to turn the unit from receiving into discharging position, switch means in said power circuit provided with a movable actuating member normally in switch-closing position but arranged, when said unit is moving into stack-discharging position, to be contacted and moved by a box stack carried on said unit into switch-opening position and thereafter to be returned to switch-closing position upon cessation of such contact through completion of stack discharge.

5. In a stack dumper, a stack receiving and discharging unit mounted for turning movement about a horizontal axis between stack-receiving and stack-discharging positions, a stack-discharging conveyer mounted upon said unit and operable to move a stack thereon longitudinally for discharge of individual boxes therefrom successively, said unit including a guide member having a circularly curved guiding surface centered in said axis, a rotatable driving member, and flexible power-transmitting means terminally secured to said unit adjacent the opposite ends of said guide member and extending over the curved guiding surface thereof into operative engagement with said rotatable driving member; together with conveyer means operable, when said unit is in stack-receiving position, to feed a box stack thereto.

6. In a stack dumper, a stack receiving and discharging unit mounted for turning movement about a horizontal axis between stack-receiving and stack-discharging positions, a stack-discharging conveyer mounted upon said unit and operable to move a stack thereon longitudinally for discharge of individual boxes therefrom successively, said unit including a guide member in the form of a semicircular segment centered in said axis and presenting a flanged peripheral guide channel, a driving sprocket, and a sprocket chain guided in said channel, trained around said sprocket and terminally secured to said unit adjacent the channel ends; together with conveyer means operable, when said unit is in stack-receiving position, to feed a box stack thereto.

7. Apparatus as set forth in claim 5, which further includes electric power means and variable circuit connections therefor, adapted and arranged when suitably actuated to cause the stack-feeding conveyer means to feed stacks singly to said unit, and circuit control means mounted in part upon said guide member for effecting such actuation in proper synchronism with the turning movements of said unit.

8. Apparatus as set forth in claim 6, which further includes electric power means and variable circuit connections therefor, adapted and arranged when suitably actuated to cause the stack-feeding conveyer means to feed stacks singly to said unit, and circuit control means mounted in part upon said guide member for effecting such actuation in proper synchronism with the turning movements of said unit.

9. Apparatus for handling stacked boxes or the like, which comprises a stack-receiving and discharging unit mounted for swinging movement about a horizontal axis between a relatively upright stack-receiving position as one limit and a reclining stack-discharging position as the other limit, a stack-advancing conveyer intermittently operable to advance a plurality of serially arranged stacks of boxes simultaneously toward said unit, a relatively short stack-feeding conveyer continuously driven to move at a more rapid rate than the stack-advancing conveyer, arranged to receive individual stacks as they are successively delivered therefrom and feed them one at a time to said unit, separate electric motors and power circuits for operating the respective conveyers, two switches connected in parallel in the power circuit of the stack-advancing conveyer motor having control members arranged in the path of stack travel and continuously but yieldably urged toward closed-circuit position; one of said control members being arranged to be engaged and moved into open-circuit position by a stack arriving at the delivery end of said stack-advancing conveyer, and the second control member being arranged to be engaged and moved into open-circuit position by such stack, in its further travel, but only after said stack has been delivered to said stack-feeding conveyer and has released the first control member; together with means adapted and arranged to maintain said second control member in open-circuit position while not engaged by a stack, except when said unit is substantially in its relatively upright stack-receiving position.

10. Apparatus as set forth in claim 9, which includes an electric motor and a power circuit for operating said unit with the stated swinging movement, a switch in the last-mentioned circuit having a control member located operatively adjacent the second control member aforesaid, said second control member being provided with a stack-engageable surface of such extent and shape that engagement thereof by a stack being fed to the unit causes the movement of said second control member to occur in two stages, in the first of which it attains open-circuit position, and in the second of which it also engages and moves said control member of the operating motor for the swingable unit into closed-circuit position, thereby actuating said motor to swing the unit back into stack-discharging position.

11. Apparatus as set forth in claim 10, which further includes a detent member adapted and arranged to engage said second control member in the aforesaid second stage of the latter's stated movement and to restrain it against return movement to circuit-closing position while said unit is substantially out of stack-receiving position, and means operable by movement of said unit into receiving position to release said control member from engagement by said detent member.

WALTER E. MILLER.

REFERENCES CITED

The following references are of record in the file of this patent:

UNITED STATES PATENTS

| Number | Name | Date |
| --- | --- | --- |
| 1,587,593 | Lasch et al. | June 8, 1926 |
| 1,907,458 | Stevenson | May 9, 1933 |
| 2,127,007 | Paxton | Aug. 16, 1938 |
| 2,136,488 | Byington | Nov. 15, 1938 |
| 2,397,122 | Davis | Mar. 26, 1946 |